(12) United States Patent
Takinami et al.

(10) Patent No.: US 6,347,219 B1
(45) Date of Patent: Feb. 12, 2002

(54) TRANSMISSION SYSTEM, TRANSMISSION/RECEPTION SYSTEM, AND LOCAL OSCILLATOR TO BE USED IN THE SAME

(75) Inventors: Koji Takinami; Hisashi Adachi; Hiroaki Kosugi; Ikuo Ohta, all of Osaka; Jyunichi Yoshizumi; Toshiaki Nakamura, both of Nara, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/372,032

(22) Filed: Aug. 11, 1999

(30) Foreign Application Priority Data

Aug. 19, 1998 (JP) ............................................ 10-232639

(51) Int. Cl.⁷ ............................................... H04B 17/02
(52) U.S. Cl. ...................... 455/141; 455/112; 455/118; 455/147; 455/209; 455/216
(58) Field of Search ................................ 455/108, 112, 455/118, 131, 141, 147, 180.3, 209, 210, 211, 216, 255, 258, 260, 264, 86

(56) References Cited

U.S. PATENT DOCUMENTS 6,163,684 A * 12/2000 Birleson ................... 455/182.3

FOREIGN PATENT DOCUMENTS

JP          4-53302         2/1992
JP          4-87424         3/1992

* cited by examiner

*Primary Examiner*—Tracy Legree
*Assistant Examiner*—Temica M. Davis
(74) *Attorney, Agent, or Firm*—Jacobson Holman, PLLC

(57) ABSTRACT

A method for generating a local oscillation signal comprising two separate frequency converters, of which one frequency converter includes an output unit for generating an internal output signal to be used for its frequency conversion, and the other frequency converter employs the same internal output signal from the output unit as the local oscillation signal.

6 Claims, 7 Drawing Sheets

TRANSMISSION SYSTEM, TRANSMISSION/RECEPTION SYSTEM, AND LOCAL OSCILLATOR TO BE USED IN THE SAME

BACKGROUND OF THE INVENTION

1. Field of the Invention

The present invention relates to a transmission system and a transmission/reception system to be used for radio communications, and a local oscillator to be used in the same.

2. Description of the Related Art

The system to be used in the field of radio communications is generally equipped with a reception circuit, in which the frequency of a received signal is lowered into an intermediate frequency signal by frequency converting means and is then demodulated, and a transmission circuit in which the intermediate frequency signal is modulated and then converted into a transmission frequency by frequency converting means and is transmitted.

The two above frequency converting means to be used respectively in the reception circuit and the transmission circuit converts an input signal of a frequency fr into an output signal of a frequency fi by mixing it with a local oscillator output signal of a frequency f1. At this time, the difference between the frequency fr of the input signal and the frequency f1 of the local oscillator output signal is the frequency fi of the output signal. Here, the input signal is the received signal in the reception circuit and the intermediate frequency signal in the transmission circuit. On the other hand, the output signal is the intermediate frequency signal in the reception circuit and the transmitted signal in the transmission circuit.

Now when the received signal of the frequency fr is converted in the reception circuit into the intermediate frequency signal of the frequency fi, a signal component of a frequency fg, located on the opposite side of the frequency spectrum from the received signal with respect to the frequency f1 of the local oscillator output signal, is also converted likewise as the intermediate frequency signal. This signal component is called "image frequency", and interferes with the desired signal.

The image frequency fg or the frequency component signal, located on the opposite side from the received signal with respect to f1, will be described in the following. When the frequency fr of the received signal is higher than the frequency f1 of the local oscillator output signal (that is, fr>f1), more specifically, the frequency fg of the image frequency is expressed by fg=f1−(fr−f1). When the frequency fr of the received signal is lower than the frequency f1 of the local oscillator output signal (that is, fr<f1), on the contrary, the frequency fg of the image frequency is expressed by fg=f1+(f1−fr)

In order to avoid the interference caused by such image frequency, it is necessary for the system to filter the image frequency component signal out of the received signal at a stage before the received signal is converted into the intermediate frequency signal.

When the frequency f1 of the local oscillator output signal and the frequency fr of the received signal are extremely close to each other, however, a filter having minute passing functionality is required, with such strict design specification, that it becomes difficult to realize. In order to eliminate this disadvantage, there has been known in the prior art the double conversion type system in which the passing functionality requirement of the filter is loosened by performing the frequency conversion two times. The system is advantageous not only in that the filter can be realized relatively easily but also in that the output frequency of the local oscillator and the frequency of the transmitted signal do not come close to each other so that the influences of the transmitted signal upon the local oscillator are reduced, thus stabilizing the characteristics of the local oscillator.

FIG. 8 shows one example of the system which was conceived by us but not realized by us to be already well known in the art. This system is constructed to include a reception circuit 102, a transmission circuit 103, a first local oscillator 130 and a second local oscillator 131.

The reception circuit 102 is equipped with band-pass filters 101 and 106, an amplifier 104 for amplifying a received signal, frequency converters 105 and 107.

The transmission circuit 103 is equipped with a modulator 110, a frequency converter 109 and an amplifier 108 for amplifying a transmitted signal.

The local oscillators 130 and 131 are each constructed of a frequency synthesizer.

The local oscillator 130 is equipped with a voltage-controlled oscillator 111, a frequency divider 112, a variable frequency divider 113, a phase comparator 115 and a loop filter 116. The local oscillator 131 is equipped with a voltage-controlled oscillator 117, a frequency divider 118, a variable frequency divider 119, a phase comparator 121 and a loop filter 122.

The local oscillator 130 stabilizes the frequency by dividing the oscillatory frequency of the oscillator 111 with the dividers 112 and 113, by making comparison with the phase of a reference signal using the phase comparator 115, and by feeding the comparison result to the oscillator 111 through a phase-locked loop [which is composed of the frequency divider 112, the variable frequency divider 113, the phase comparator 115 and the loop filter 116 in that order].

The local oscillator 131 also functions to stabilize the frequency by dividing the oscillatory frequency of the oscillator 117 by the frequency divider 118 and the variable frequency divider 119, by making a comparison with the phase of a reference signal by the phase comparator 121, and by feeding the comparison result to the oscillator 117 through a phase-locked loop [which is composed of the frequency divider 118, the variable frequency divider 119, the phase comparator 121 and the loop filter 122 in that order].

Here will be described the actions of this system.

At time of reseption, the received signal, as received by an antenna 99, is sent to the receiving circuit 102 through a transmit-receive switch 100. This received signal is filtered to remove unnecessary frequency component signals by the band-pass filter 101 of the reception circuit 102 and is amplified by the amplifier 104 and converted into a first intermediate frequency signal by the frequency converter 105. In this case, the frequency converter 105 converts the received signal into the first intermediate frequency signal by mixing it with the output signal of the local oscillator 130.

The first intermediate frequency signal is filtered to remove the frequency component signals (the noise components) other than the desired intermediate frequency component signal by the filter 106 and is frequency-converted into a second intermediate frequency signal by the frequency converter 107. In this case, the frequency converter 107 converts the first intermediate frequency signal into the second intermediate frequency signal by mixing it with the output signal of the local oscillator 131. Finally, the second intermediate frequency signal is outputted to the demodulator (not shown).

At time of transmitting, the output signal of the second local oscillator 131 is inputted to and modulated by the modulator 110 and is then converted into a transmission frequency signal by the frequency converter 109. In this case, the frequency converter 109 converts the output signal of the modulator 110 into the transmission frequency signal by mixing it with the output signal of the local oscillator 130. This transmission frequency signal is amplified by the amplifier 108 and is fed to the antenna 99 through the switch 100.

Such a system is required to have two local oscillators such as the local oscillators 130 and 131, so that its construction is complicated raising the cost.

Here, the prior art that has succeeded in eliminating the defects of the system is exemplified firstly as disclosed in Unexamined Published Japanese Patent Application Nos. 4-87424 and 4-53302.

The first prior art example is equipped, as shown in FIG. 9, with means 141 for multiplying the output signal of a local oscillator 140 so that this single local oscillator 140 is used in a plurality of frequency converters (or mixer circuits) 142 and 143. In FIG. 9: reference numeral 144 designates a variable attenuator; numeral 145 an amplifier; numeral 146 a voltage-controlled filter; numeral 147 an amplifier; numeral 148 a fixed filter; numeral 149 an amplifier; numeral 150 an amplifier; and numeral 151 a controller.

The second prior art example is equipped, as shown in FIG. 10, with means 161 for multiplying the output signal of a local oscillator 160, and means 162 for dividing the frequency, so that the single local oscillator 160 is used in a plurality of frequency converters 163 and 164.

In such prior art examples, unlike the aforementioned double conversion type, the single local oscillator can be used in a plurality of frequency converters so that the construction can be accordingly simplified to lower the cost.

However, the first prior art example has to be newly provided with the frequency dividing means. On the other hand, the second prior art example has to be newly provided with the frequency dividing means and the multiplication means. As a result, these prior art examples are additionally provided with frequency dividing means and multiplication means so that they can avoid neither a increase in the number of parts nor a rise in a cost.

SUMMARY OF THE INVENTION

Therefore, a main object of the invention is to provide a reception system and a transmission/reception system which miniaturize the size and lower construction cost by simplifying the construction of means for generating a local oscillation signal.

Another object of the invention is to make it unnecessary to generate a local oscillation signal for another frequency converting means separately by using the output signal of the frequency dividing means in one frequency converting means as the local oscillation signal of the other frequency converting means, thereby simplifying the construction, for miniaturized size and lowered costs.

Still another object of the invention is to make it unnecessary to process the output signal of the frequency dividing means to be the local oscillation signal used in the other frequency converting means by using the output signal of the frequency dividing means of one frequency converting means as it is, as the local oscillation signal of the other frequency converting means, thereby simplifying the construction for miniaturized size and lowered cost.

Still another object of the invention is to make it unnecessary to provide means for eliminating spurious signals by using an output signal of the frequency dividing means known to have little spuriousness, compared with a multiplier or a frequency-multiplying system, as the local oscillatory signal of the other frequency converting means, thereby simplifying the construction, for lowered costs and miniaturized size.

Still another object of the invention is to improve performance, by preventing the close similarity of the frequency of the local oscillation signal of one frequency converting means and the frequency of the transmission carrier wave thereby eliminating the influence of the local oscillation signal upon the transmission carrier wave thus in turn eliminating occurrence of defects such as frequency fluctuations of the transmission carrier wave.

Still another object of the invention is to make it unnecessary to provide means for mixing the local oscillation signal with another signal by using the local oscillation signal of one frequency converting means directly as the transmission carrier wave thereby simplifying construction, for miniaturized size and lowered costs.

Still another object of the invention is to eliminate distortions to improve the characteristics, by amplifying a carrier wave having an unmodulated single frequency and then modulating it at a last stage.

Still another object of the invention is to prevent invasion of noises thereby to improve the characteristics, by closing a second gate of a dual gate FET at receiving time to ensure the disconnection with the transmission side signal line during the receiving action.

In order to achieve the above-specified objectives, according to the invention, there is provided a reception system comprising: first frequency converting means for converting the frequency of a received signal by mixing it with a first local oscillation signal; and second frequency converting means for converting the frequency of an output signal of said first frequency converting means by mixing it with a second local oscillation signal, wherein one of said frequency converting means includes at least: local oscillation signal generating means for generating a local oscillation signal usable by said one of the frequency converting means; and an output unit for generating an internal output signal to be used for the frequency conversion of said one of the frequency converting means, and wherein the other of the said frequency converting means employs said internal output signal outputted from output portion of said one of the frequency converting means, as the local oscillation signal used by said other frequency converting means.

According to the invention, the local oscillation signal to be used in the other frequency converting means is the internal output signal which is also used in frequency conversion by the one frequency converting means, so that the local oscillation signal of the other frequency converting means need not be separately generated, thereby simplifying the construction for miniaturized size and lowered costs.

Further, the internal output signal to be used in frequency conversion by the one frequency converting means is used as it is, as the local oscillation signal of the other frequency converting means, the internal output signal not needing to be processed to be the local oscillation signal of the other frequency converting means, thereby simplifying the construction, for miniaturized size and lowered costs.

BRIEF DESCRIPTION OF THE DRAWINGS

The remaining objects of the invention will become apparent from the understanding of embodiment to be described hereinafter and will be clarified in the appended claims of the invention. A number of advantages, not touched upon herein, will be noticed by those skilled in the art, if the invention is practiced.

DETAILED DESCRIPTION OF THE INVENTION

The invention will be described in connection with its preferred embodiments with reference to the accompanying drawings.

Figure 1:
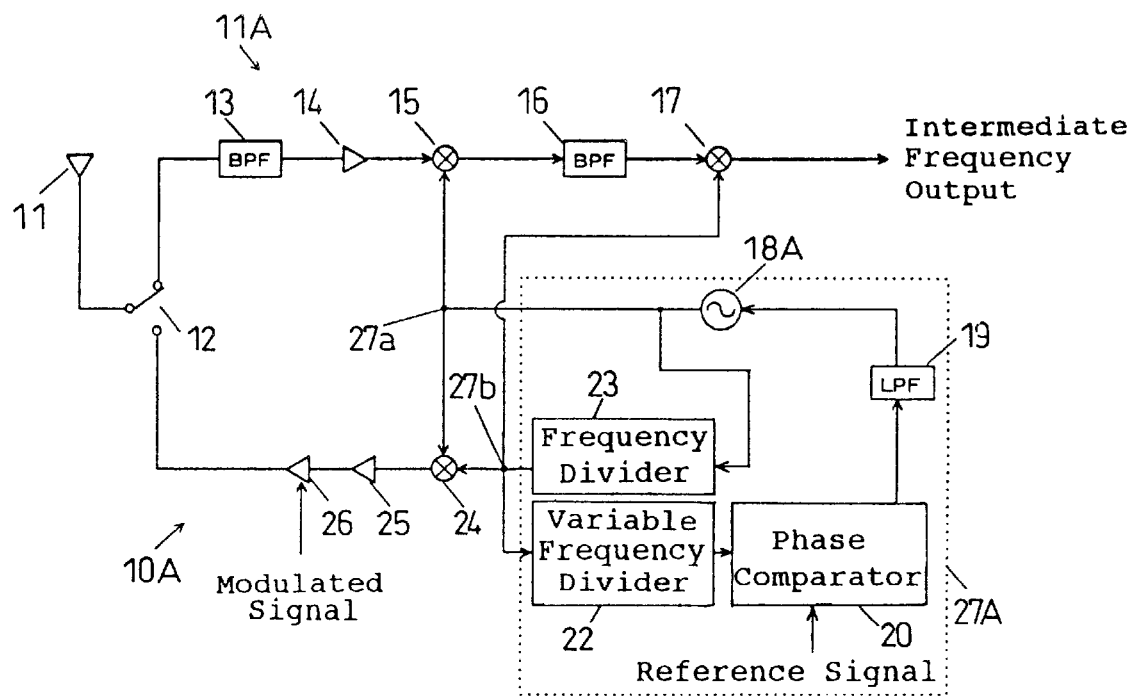
FIG. 1 is a circuit diagram showing a construction of a transmission/reception system according to a first preferred embodiment of the invention.

FIG. 1 shows a construction of a transmission/reception system according to a first embodiment of the invention.

This system is constructed to include a transmitting/receiving antenna 11, a transmission circuit 10A, a reception circuit 11A, a transmit-receive switch 12, and a local oscillator 27A. The switch 12 switches the connections of the transmission circuit 10A and the reception circuit 11A with the antenna 11.

The local oscillator 27A feeds the transmission circuit 10A and the reception circuit 11A with a local oscillation signal. This system is constructed of: a receiver composed of the antenna 11, the reception circuit 11A and the local oscillator 27A; and a transmitter composed of the antenna 11, the transmission circuit 10A and the local oscillator 27A.

The local oscillator 27A is equipped with a voltage-controlled oscillator 18A, a frequency divider 23, a variable frequency divider 22, a phase comparator 20 and a loop filter 19 so that it has a construction of a frequency synthesizer. The frequency divider 23, the variable frequency divider 22, the phase comparator 20 and the loop filter 19 construct a phase-locked loop for the oscillator 18A to stabilize the output frequency of the oscillator 18A.

This system is equipped with signal generator 27a for outputting signal of the oscillator 18A, and signal generator 27b for outputting a signal of the frequency divider 23 from the phase-locked loop.

The reception circuit 11A is equipped with a band-pass filter 13 for passing only a particular band of a received signal, an amplifier 14 for amplifying the output signal of the filter 13, a first frequency converter 15 for frequency-converting the output signal of the amplifier 14 into a first intermediate frequency signal, a band-pass filter 16 for passing only a particular band of the first intermediate frequency signal, and a second frequency converter 17 for frequency-converting the output signal of the filter 16 into a second intermediate frequency signal.

The transmission circuit 10A is equipped with a third frequency converter 24 for forming a transmission carrier wave from an output signal of the frequency divider 23 and an output signal of the oscillator 18A, an amplifier 25 for amplifying the transmission carrier wave, and a modulator 26 for modulating an output signal of the amplifier 25.

Figure 2:
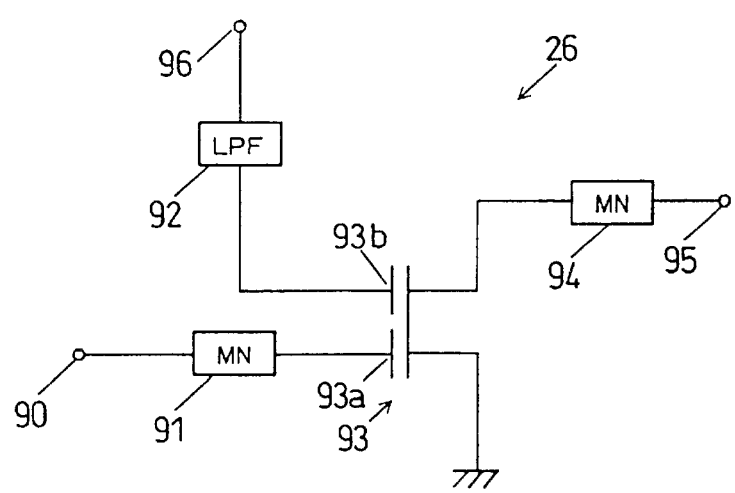
FIG. 2 is a circuit diagram showing a construction of a modulator which is one component of the system of FIG. 1.

As shown in FIG. 2, the modulator 26 is equipped with input terminals 90 and 96, a matching networks 91 and 94, a filter 92, a dual gate FET 93 and an output terminal 95. The input terminal 90 is connected with a first gate 93a of the dual gate FET 93, and the input terminal 96 is connected with a second gate 93b of the same.

In this system, one example of one frequency converting means is constructed with the first frequency converter 15 and the local oscillator 27A. Further, one example of the other frequency converting means is constructed with the second frequency converter 17. Further, one example of local oscillation signal generating means is constructed with the oscillator 18A. Further, one example of a first signal generator for the local oscillator 27A is the output unit 27a. Further, one example of a second output unit of the local oscillator 27A is the output unit 27b. Further, one example of an internal signal output unit in the system is constructed from the output unit 27b. Further, one example of frequency dividing means is constructed from the frequency divider 23. Further, one example of phase comparing means is constructed from the phase comparator 20. Further, one example of transmission carrier wave generating means of the system is constructed with the frequency divider 23, the oscillator 18A and the third frequency converter 24. Further, one example of amplification means of the system is constructed from the amplifier 25. Further, one example of modulation means of the system is constructed from the modulator 26.

The local oscillator 27A generates an output signal (or a first local oscillation signal) for generating the first intermediate frequency signal at the oscillator 18A and the output unit 27a feeds it to the first frequency converter 15 of the reception circuit 11A. On the other hand, the local oscillator 27A divides the frequency of the output signal of the oscillator 18A frequency divider 23. By this frequency division, moreover, a circulating output signal of the phase-locked loop is generated and fed to the variable frequency divider 22 and is fed as an output signal (or a second local oscillation signal) for generating a second intermediate frequency signal through the output unit 27b to the second frequency converter 17 of the reception circuit 11A.

Thus in this system, the output signals (or the first and second local oscillation signals) for generating the first and second intermediate frequency signals can be generated by the single local oscillator 27A so that construction is accordingly simplified. In this system, moreover, the output signal (or the second local oscillation signal) for generating the second intermediate frequency signal is composed of the output signal of the frequency divider 23 in the local oscillator 27A. This makes it unnecessary to provide separate means for generating the output signal for generating the second intermediate frequency from the output signal of the local oscillator 27A, so that the construction is further simplified.

On the other hand, the frequency divider is generally characterized to have little spuriousness in its output signal. As a result, the local oscillation signal of the second frequency converter 17 can be obtained with little spuriousness by adopting the output signal of the frequency divider 23 as the local oscillation signal to be used in the second frequency converter 17. This makes it unnecessary to provide spuriousness eliminating means such as a band-pass filter for eliminating the spuriousness from the output of the frequency divider 23, so that the construction is further simplified.

The frequency divider 23 is not newly modified for generating the local oscillation signal of the second frequency converter 17 but is the frequency divider which is contained in the phase-locked loop packaged in the system in the prior art, so that the construction is further simplified, as will be described in the following.

For example, the system (a receiver in this case) is required, when packaged in the portable telephones now spreading, to be usable with high-frequency bands. However, the phase comparison to be made in the phase-locked loop packaged in the system is usually effected with digital signals. As the frequency band to be processed with signals rises, therefore, the signal processing of the phase comparator which is in the phase-locked loop cannot adapt accordingly. This disadvantage can be eliminated by providing a multiplier or a frequency divider.

The multiplier is provided in the following manner. Specifically, the phase comparator can be adapted to high frequency bands by connecting the phase-locked loop with a voltage-controlled oscillator for generating an output signal having a relatively low frequency. On the other hand, a high-frequency band can be matched by providing the output unit of the voltage-controlled oscillator with a multiplier.

The frequency divider is provided in the following manner. Specifically, the frequency divider is enabled to deal with the high-frequency band by providing a voltage-controlled oscillator for generating an output signal of a high frequency. By interposing the frequency divider between the input side of the phase comparator of the phase-locked loop and the voltage-controlled oscillator, on the other hand, the frequency band of the signal to be inputted to the phase comparator 20 is lowered to such a band as can be dealt with by the signal processing of the phase comparator.

When a multiplier is provided, another filter is required for eliminating the spuriousness. When a frequency divider is provided, however, such filter can be dispensed with, thereby reducing the number of parts and miniaturizing the size. In the transmission/reception system of a first preferred embodiment of the invention, therefore, the frequency divider 23 is provided in the phase-locked loop to match the high-frequency band. Moreover, this frequency divider 23 is positively employed as the output source for the second local oscillation signal so that the construction is further simplified.

Thus in the first preferred embodiment, the construction is made relatively simple, to realize a double conversion type transmission/reception system capable of miniaturizing size and lowering cost.

Here will be described the signal reception operations.

For these reception operations, the switch 12 switches at first its connection to the reception circuit 11A, i.e., to the receiving side. As a result, the received signal of the antenna 11 is sent through the switch 12 to the band-pass filter 13 so that its unnecessary frequency component signal is filtered out. The output signal of the filter 13 is amplified by the amplifier 14 and is converted into the first intermediate frequency signal by the first frequency converter 15. At this time, this first frequency converter 15 is fed with the output signal of the oscillator 18A from the output unit 27a of the local oscillator 27A. As a result, the first frequency converter 15 converts the output signal of the amplifier 14 into the first intermediate frequency signal by mixing it with the output signal of the oscillator 18A.

The first intermediate frequency signal, as outputted from the first frequency converter 15, is selectively filtered out to isolate a desired frequency component signal through the filter 16 and is then converted into the second intermediate frequency signal by the second frequency converter 17 and fed to the (not-shown) demodulator. At this time, the second frequency converter 17 is fed the output signal of the frequency divider 23 by the output unit 27b of the local oscillator 27A. As a result, the second frequency converter 17 converts the output signal of the filter 16 into the second intermediate frequency signal by mixing it with the output signal of the frequency divider 23.

In these receiving actions, the second gate 93b of the dual gate FET 93 is closed so that the disconnection between the transmit side signal line and the modulator 26 can be ensured during the receiving actions to insure that invasion of noises is prevented.

Here will be described the transmission operations.

For these transmission operations, the switch 12 first switches its connection to the transmission circuit 10A, i.e., to the transmission side. Here, the third frequency converter 24 is fed with the output signal of the oscillator 18A from the output portion 27a of the local oscillator 27A. The third frequency converter 24 is further fed the output signal of the frequency divider 23 by the output unit 27b of the local oscillator 27A. When the switch 12 switches its connection to the transmission side, therefore, the third frequency converter 24 mixes the output signal of the oscillator 18A with the output signal of the frequency divider 23 to generate the transmission carrier wave.

This transmission carrier wave thus generated is amplified by the amplifier 25 and is inputted to and modulated by the modulator 26. The modulations by the modulator 26 are performed in the following manner.

Specifically, the transmission carrier wave is amplified by the amplifier 25 and is then inputted to the input terminal 90. The carrier wave is then inputted through the matching network 91 to the first gate 93a of the dual gate FET 93. On the other hand, the modulated signal is inputted from the input terminal 96 to pass through the filter 92, thereby having its band narrowed, and is then inputted to the second gate 93b of the dual gate FET 93. By this modulated signal, the signal inputted to the first gate 93a is subjected to an amplitude modulation and is outputted through the matching network 94 from the output terminal 95. The output signal of the modulator 26, as outputted from the output terminal 95, is transmitted through the switch 12 by the antenna 11.

Figure 3A:
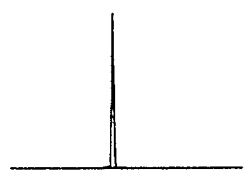
FIG. 3 presents diagrams for explaining a signal distortion.
Figure 3B:
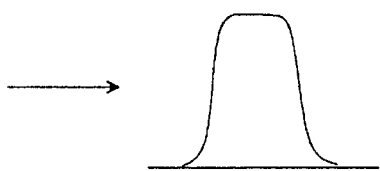
Figure 3C:

In this system, the unmodulated transmission carrier wave is amplified by the amplifier 25 and is then modulated in amplitude by the modulator 26 so that the distortion can be suppressed. Specifically, when the output signal of the oscillator 18A, having a signal spectrum shown in FIG. 3(a), is modulated, the signal spectrum is extended, as shown in FIG. 3(b). When the modulated signal having this extended signal spectrum is subjected to a frequency conversion and an amplification, it is impossible to avoid a distortion (i.e., the so-called "three-dimensional distortion") in the vicinity of the two ends of the signal spectrum, as shown in FIG. 3(c). In this system, on the contrary, the output signal of the oscillator 18A is modulated by the modulator 26 after having been subjected to the frequency modulation by the third frequency converter 24 and the amplification by the amplifier 25, so that the distortion shown in FIG. 3(c) is eliminated. Here, this distortion is caused mainly by the non-linear characteristics of the amplifier 25, and this non-linearity is not completely reduced to zero even in the amplification region in which the linear characteristics are exhibited, so that some distortions cannot be avoided.

Moreover, the transmission carrier wave is generated by mixing the output signal of the oscillator 18A with the output signal of the frequency divider 23 so that its frequency is not near but relatively far from the output frequency of the oscillator 18A. As a result, the transmission carrier wave is hardly influenced by the output signal of the oscillator 18A so that it is not troubled by frequency fluctuations or the like.

Here, the oscillation frequency of the oscillator 18A and the division ratio of the frequency divider 23 are so set that the second intermediate frequency and the transmission frequency may take desired values. Specifically, the system is so conditioned that the second intermediate frequency is equal to the difference between the transmission and reception frequencies, which compose one communication channel. In this embodiment, the aforementioned condition is satisfied by setting an oscillation frequency $f_L$ of the oscillator 18A to a transmission frequency $f_{tx}$ multiplied by $N/(N+1)$ if the frequency division number of the frequency divider 23 is designated by N, as follows:

$$f_L = \{N/(N+1)\} \times f_{tx} \quad (1)$$

This will be described by the following calculations. Specifically, an output frequency f1 of the first frequency converter 15 is determined by the following Equation (2):

$$f_1 = f_r - f_L \quad (2),$$

wherein:

$f_1$: the output frequency of the first frequency converter 15;

$f_r$: the frequency of the received signal; and $f_L$: the output frequency of the oscillator 18A.

An output frequency $f_2$ of the second frequency converter 17 is determined by the following Equation (3):

$$f_2 = f_1 - f_h \quad (3),$$

wherein:

$f_2$: the output frequency of the second frequency converter 17; and $f_h$: the output frequency of the frequency divider 23.

If Equation (2) is substituted for Equation (3), the following Equation (4) is obtained:

$$f_2 = f_r - f_L - f_h \quad (4).$$

Here, the output frequency fh of the frequency divider 23 is 1/N of the output frequency fL of the oscillator 18A so that Equation (4) is transformed into Equation (5):

$$f_2 = f_r - f_L - (1/N) \times f_L = f_r - \{(N+1)/N\} \times f_L \quad (5),$$

wherein:

N: the frequency division number of the frequency divider 23. If Equation (1) is substituted for Equation (5), the following Equation (6) is obtained:

$$f_2 = f_r - \{(N+1)/N\} \times \{N/(N+1)\} \times f_{tx} = f_r - f_{tx} \quad (6)$$

wherein:

ftx: the transmission frequency.

Thus, for the frequency division number N of the frequency divider 23, the second intermediate frequency can be made equal to the interval between the transmission and reception frequencies composing one communication channel (i.e., $f_2 = f_r - f_{tx}$) by setting the oscillation frequency $f_L$ of the oscillator 18A to the transmission frequency $f_{tx}$ multiplied by $N/(N+1)$.

For example, for a reception frequency of 5.795 GHz, the transmission frequency of 5.835 GHz and the second intermediate frequency of 40 MHz, the frequency division number is 4, and the frequency of the local oscillator is 4.668 GHz.

In the first embodiment, the output signal of the oscillator 18A is outputted to the first frequency converter 15, and the output signal of the frequency divider 23 is outputted to the second frequency converter 17. Conversely, it goes without saying that the output signal of the oscillator 18A may be outputted to the second frequency converter 17 and the output signal of the frequency divider 23 may be outputted to the first frequency converter 15.

Figure 4:
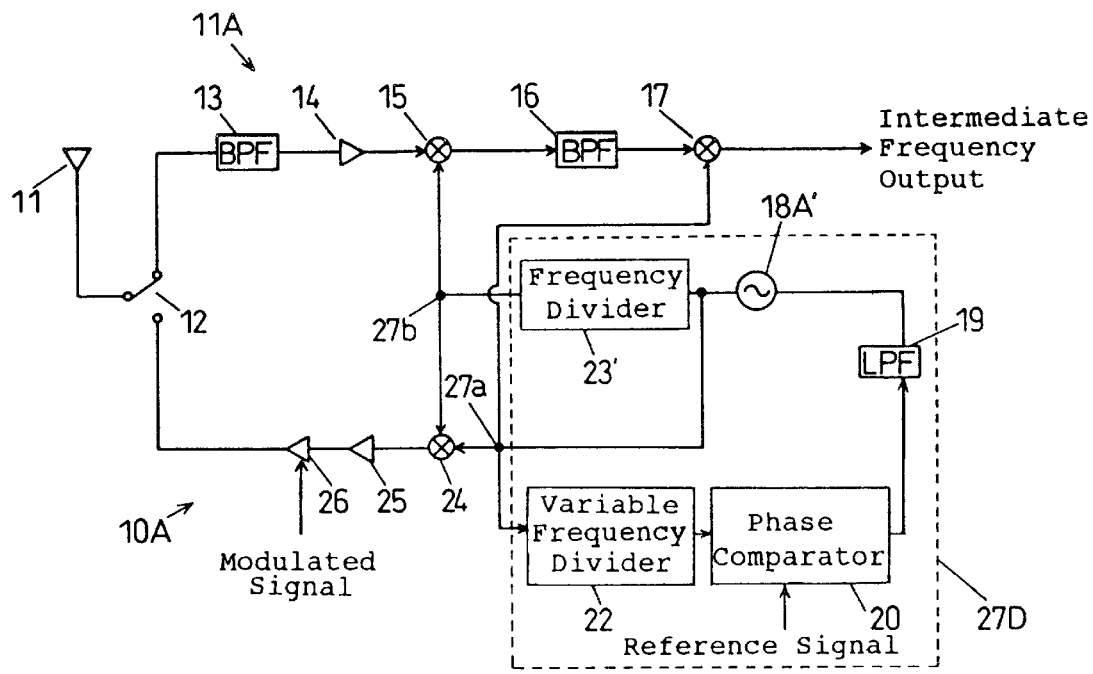
FIG. 4 is a circuit diagram showing a construction of a transmission/reception system according to a modification of the first preferred embodiment.

In the first embodiment, on the other hand, the frequency divider 23, in the phase-locked loop, is adopted as a feed source of the output signal for generating the second intermediate frequency signal, and its output signal is fed to the second frequency converter 17. As shown in FIG. 4, however, a frequency divider 23' for dividing the frequency of the output signal of a voltage-controlled oscillator 18A' may be provided in a local oscillator 27D. In this case, the frequency divider 23' is arranged separately from the phase-locked loop, and its output signal is fed as an output signal for generating the first intermediate frequency signal, from the output unit 27b to the first frequency converter 15. Moreover, the output signal of the oscillator 18A' is fed as an output signal for generating the second intermediate frequency signal, from the output unit 27a to the second frequency converter 17.

Figure 5:
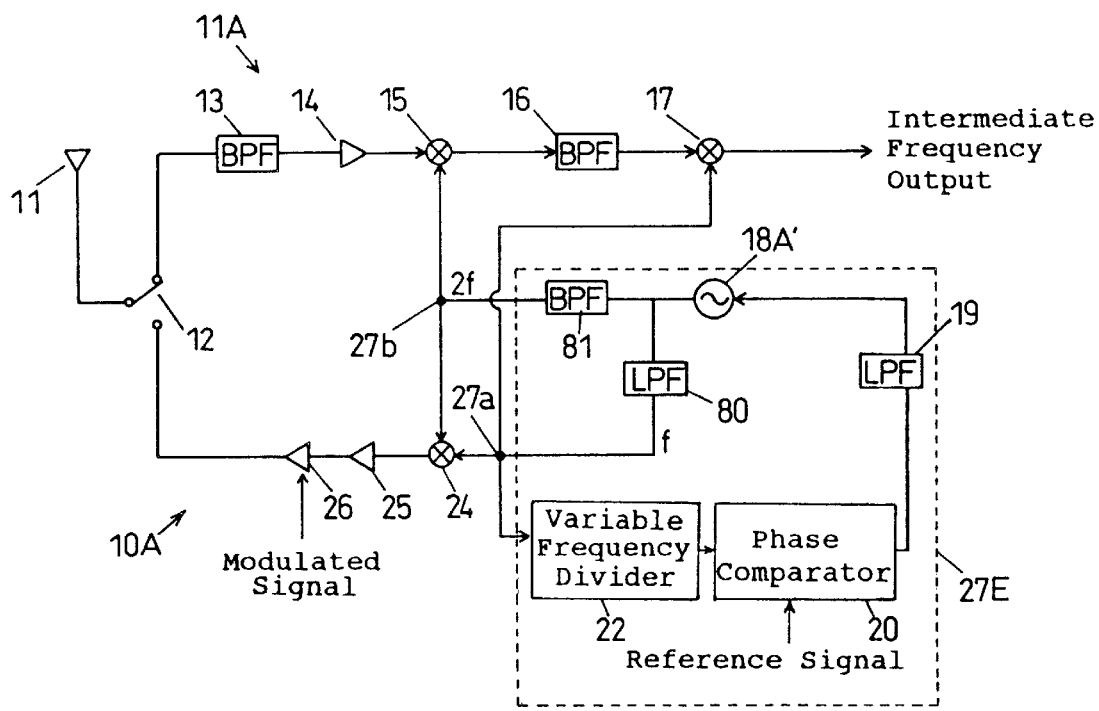
FIG. 5 is a circuit diagram showing a construction of a transmission/reception system according to another modification of the first preferred embodiment.

Moreover, the harmonic component of the oscillator 18A', which is the internal output signal of the local oscillator 27A can also be employed either as the output signal for generating the first intermediate frequency signal or as the output signal for generating the second intermediate frequency signal. As shown in FIG. 5, more specifically, a fundamental wave component signal f of the output signal of the oscillator 18A', in a local oscillator 27E, is fed as an output signal for generating the second intermediate frequency signal, from the output portion 27a to the second frequency converter 17. Further, a harmonic component of the signal of the oscillator 18A' may be fed as an output signal for generating the first intermediate frequency signal, by the output unit 27b to the first frequency converter 15. Here in FIG. 5, the harmonic component is exemplified by a doubled frequency component signal 2f but may naturally be exemplified by a harmonic component signal of a triple frequency or more. Further, in the construction of FIG. 5, filters 80 and 81 are provided for filtering the noise component or the signal outside the band out of the fundamental wave component signal f or the harmonic component 2f of the oscillator 18A', i.e., the output signal for generating the first intermediate frequency signal or the output signal for generating the second intermediate frequency signal. However, these filters 80 and 81 may be dispensed with when no conditions regarding spuriousness are strictly required of the system.

Figure 6:
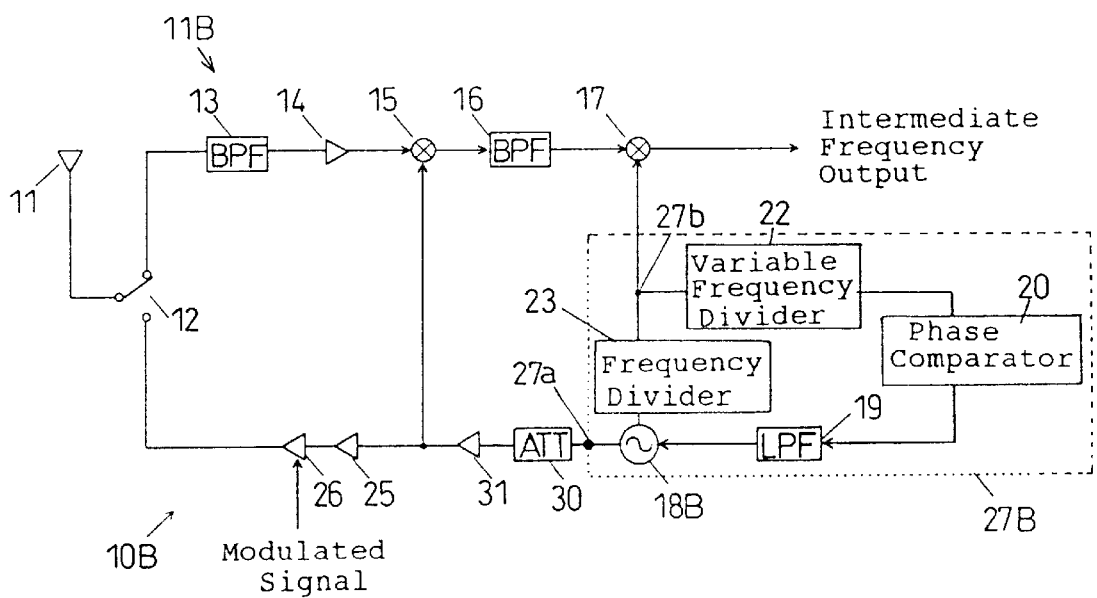
FIG. 6 is a circuit diagram showing a construction of a transmission/reception system according to a second preferred embodiment of the invention.

FIG. 6 shows a construction of a transmission/reception system according to a second preferred embodiment of the invention. This system is basically given a construction similar to that of the system according to the first preferred embodiment, and the identical or similar portions will not be described but rather will be designated with the identical reference numerals. Specifically, the first frequency converter 15, included in a reception circuit 11B of the system, is fed, as in the first preferred embodiment, with the output signal of a voltage-controlled oscillator 18B from the output unit 27a. However, the output signal of the oscillator 18B is fed through an attenuator 30 and an amplifier 31 to the first frequency converter 15. This first frequency converter 15 generates the first intermediate frequency signal by mixing the output of the oscillator 18B with the received signal. On the other hand, the second frequency converter 17, in the reception circuit 11B, is fed with the output signal of the frequency divider 23 by the output unit 27b and generates the second intermediate frequency signal by mixing the output signal of the frequency divider 23 with the first intermediate frequency signal.

In a transmission circuit 10B, the oscillatory frequency of the oscillator 18B, in local oscillator 27B, is set to the same frequency as the transmission frequency, and the output signal of the oscillator 18B is passed through the attenuator 30 and the amplifiers 31 and 25 and modulated by the modulator 26. Thus in the system of the second preferred embodiment, the output signal of the oscillator 18B is not subjected to frequency conversion but is inputted through the amplifier 25 and modulated by the modulator 26. As a result, the oscillator 18B has to generate the signal of a high frequency, but does not need a means for frequency-converting its output signal so that its construction can be accordingly simplified. Further, the attenuator 30 and the amplifier 31 are arranged between the modulator 26 and the oscillator 18B so that the oscillator 18B hardly receives any influence from load fluctuations, as caused by the action of the modulator 26.

In the first and second embodiments, the signal distortions are reduced by arranging the modulator 26 at the final output stage. It is, however, needless to say that the modulator 26 maybe arranged at the front stage of the amplifier 25 if it is unnecessary to reduce the signal distortions.

Figure 7:
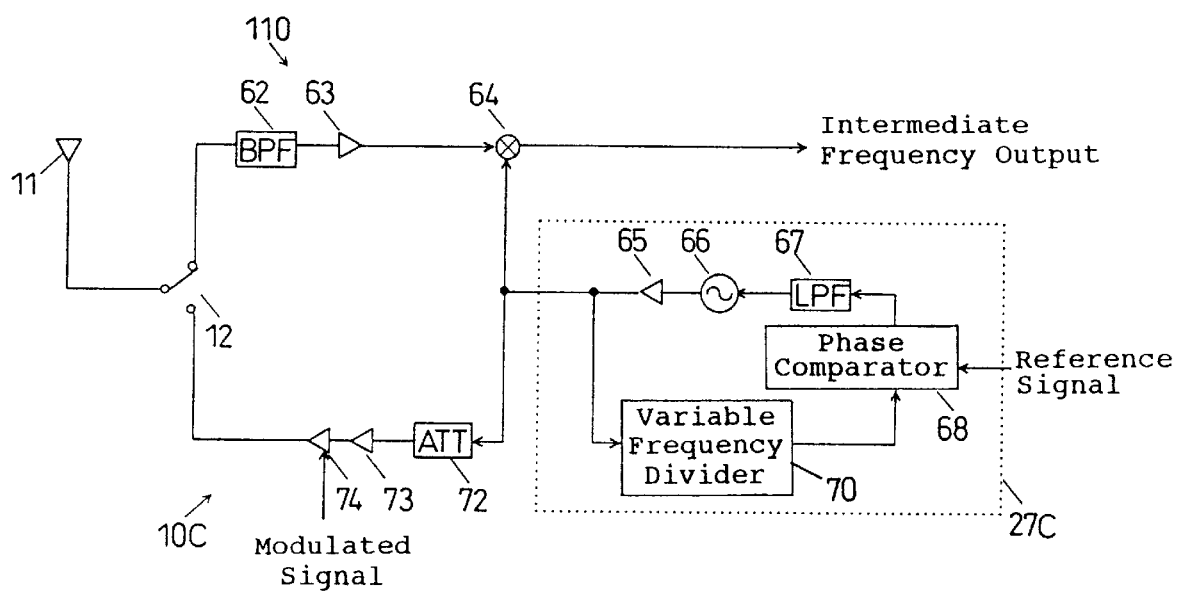
FIG. 7 is a circuit diagram showing a construction of a transmission/reception system according to another modification of the invention.
Figure 8:
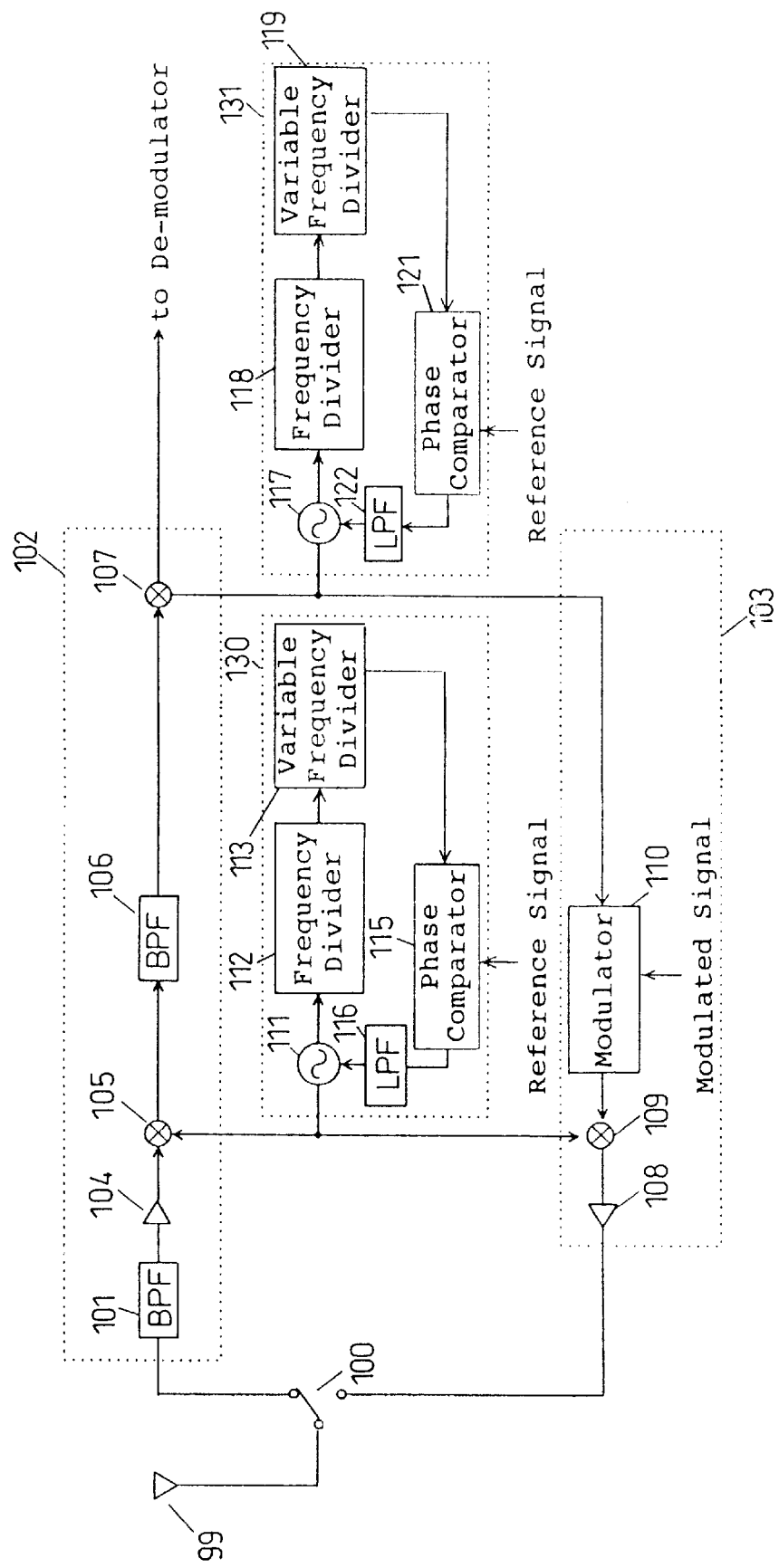
FIG. 8 is a circuit diagram showing a construction of a transmission/reception system of double conversion type.
Figure 9:
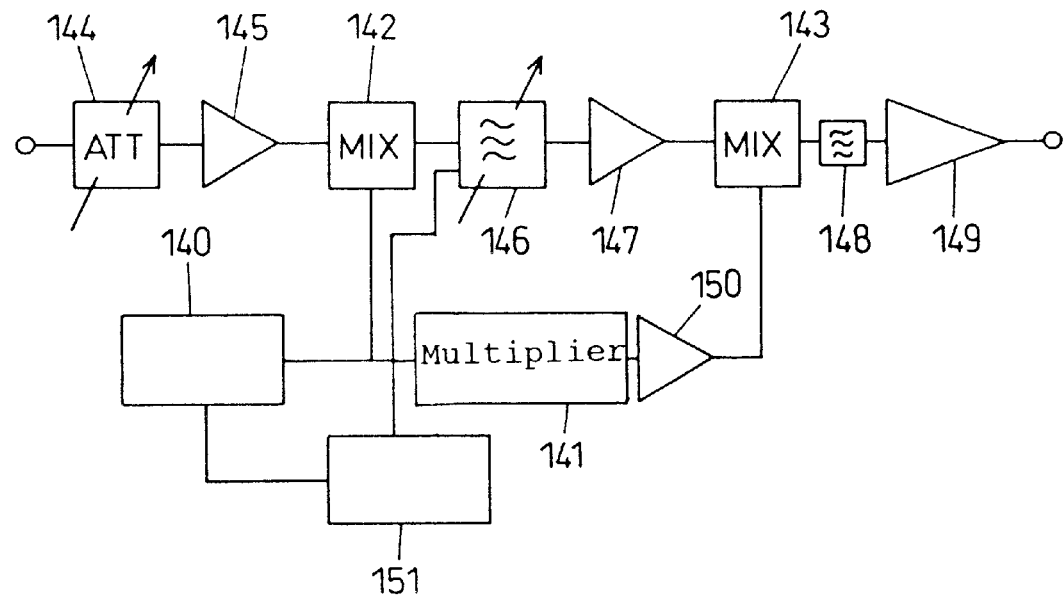
FIG. 9 is a circuit diagram showing a construction of a first example of the prior art.
Figure 10:
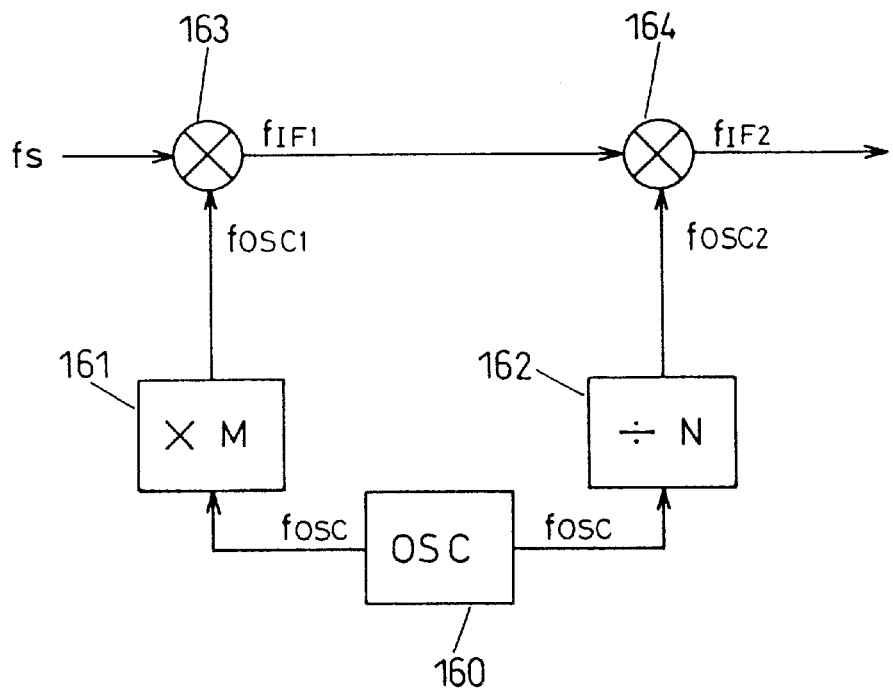
FIG. 10 is a circuit diagram showing a construction of a second example of the prior art.

The construction in which the modulator 26 is arranged at the final output stage may be employed in a single conversion type transmission/reception system, as shown in FIG. 7. The signal distortions can also be reduced by this construction. The system is constructed in the following manner. Specifically, a reception circuit 11C is equipped with a band-pass filter 62, an amplifier 63 and a frequency converter 64. On the other hand, a transmission circuit 10C is equipped with an attenuator 72, an amplifier 73 and a modulator 74. A local oscillator 27C is equipped with a voltage-controlled oscillator 66, an amplifier 65, a variable frequency divider 70, a loop filter 67 and a phase comparator 68, and sets the oscillatory frequency of the oscillator 66 to the same frequency as the transmission frequency.

In the system thus constructed, the signal distortions can be reduced by placing the modulator 74 of the transmission circuit 10C at the final stage. By interposing the amplifier 65 and the attenuator 72 between the modulator 74 and the oscillator 66, moreover, the oscillator 66 hardly receives any influence from the load fluctuations caused by the action of the modulator 74.

In these embodiments, the invention has been practiced in the analog type system but it could naturally be practiced in a digital type system as well. In the foregoing preferred embodiments, furthermore, the invention has been realized in the system but could naturally be likewise realized in a reception system.

Although the invention has been described in detail in its most preferred embodiments, the combination and array of parts for its preferred embodiments can be modified in various manners without departing from the spirit and scope thereof, as claimed in the following.

What is claimed is:

1. A reception system comprising:

first frequency converting means for converting the frequency of a received signal by mixing it with a first local oscillation signal; and second frequency converting means for converting the frequency of an output signal of said first frequency converting means by mixing it with a second local oscillation signal, wherein one of said frequency converting means includes at least:

local oscillation signal generating means for generating a local oscillation signal used in one of the said frequency converting means; and an output unit for outputting an internal output signal to be used for the frequency conversion of said one of the said frequency converting means, and wherein the other of said frequency converting means employs said internal output signal to be outputted from the output portion of said one of the frequency converting means, as the local oscillation signal used in said other frequency converting means.

2. A reception system according to claim 1, wherein said output unit utilizes a harmonic component of the local oscillation signal generated by said local oscillation signal generating means, as said internal output signal.

3. A reception system according to claim 1, wherein said one frequency converting means further includes:

frequency dividing means for dividing the frequency of the local oscillation signal which is generated by said local oscillation signal generating means; and phase comparing means for phase-comparing the output signal of said frequency dividing means and a reference signal, wherein said one frequency converting means contains a phase-locked loop for feeding back the phase-compared result of said phase comparing means to said local oscillation signal generating means, and wherein said output unit utilizes the output signal of said frequency dividing means as said internal output signal.

4. A transmission/reception system comprising:

a reception system; and a transmission system, wherein said reception system comprises:

first frequency converting means for converting the frequency of a received signal by mixing it with a first local oscillation signal; and second frequency converting means for converting the frequency of an output signal of said first frequency converting means by mixing it with a second local oscillation signal, wherein one of said frequency converting means includes at least:

local oscillation signal generating means for generating a local oscillation signal used in one of the said frequency converting means; and an output unit for outputting an internal output signal to be used for the frequency conversion of the one of said frequency converting means, wherein the other of said frequency converting means employs said internal output signal outputted from the output portion of said one of the frequency converting means, as the local oscillation signal used in said other frequency converting means, and wherein said transmission system employs the local oscillation signal which is generated by said local oscillation signal generating means, as a transmission carrier wave.

5. A transmission/reception system according to claim 4, wherein said transmission system generates the transmission carrier wave by mixing said local oscillation signal generated by said local oscillation signal generating means and said internal output signal outputted from the output unit of said one of the frequency converting means.

6. A transmission/reception system according to claim 4, wherein said one frequency converting means further includes:

frequency dividing means for dividing the frequency of the local oscillation signal which is generated by said local oscillation signal generating means; and phase comparing means for phase-comparing the output signal of said frequency dividing means and a reference signal, wherein said one frequency converting means contains a phase-locked loop for feeding back the phase-compared result by said phase comparing means to said local oscillation signal generating means, and wherein said output unit utilizes the output signal of said frequency dividing means as said internal output signal.

* * * * *